United States Patent [19]

Pullen

[11] 4,244,229

[45] Jan. 13, 1981

[54] DIFFERENTIAL PRESSURE TRANSDUCER

[75] Inventor: Roger J. Pullen, Bognor Regis, England

[73] Assignee: Sangamo Weston Controls, Limited, North Bersted, England

[21] Appl. No.: 42,270

[22] Filed: May 24, 1979

[30] Foreign Application Priority Data

May 30, 1978 [GB] United Kingdom ............... 24481/78

[51] Int. Cl.³ .............................................. G01L 9/10
[52] U.S. Cl. ...................................... 73/722; 73/708; 336/30
[58] Field of Search ................. 73/722, 706, 728, 708, 73/717, 718, 719, 720, 721, 205 R, 729; 336/30; 331/65

[56] References Cited

U.S. PATENT DOCUMENTS

| 2,564,221 | 8/1951 | Hornfeck | 336/30 |
| 3,153,935 | 10/1964 | Karlson | 73/722 |
| 4,106,342 | 8/1978 | Sormunen | 73/708 |

FOREIGN PATENT DOCUMENTS

| 325651 | 2/1930 | United Kingdom | 73/729 |
| 773677 | 5/1957 | United Kingdom . | |
| 863535 | 3/1961 | United Kingdom . | |
| 905502 | 9/1962 | United Kingdom . | |
| 1159145 | 7/1969 | United Kingdom . | |
| 1179973 | 2/1970 | United Kingdom . | |
| 1315577 | 5/1973 | United Kingdom . | |
| 1384226 | 2/1975 | United Kingdom . | |
| 1455375 | 11/1976 | United Kingdom . | |

Primary Examiner—Donald O. Woodiel
Attorney, Agent, or Firm—Mikio Ishimaru; Dale Gaudier; Joseph J. Kaliko

[57] ABSTRACT

A differential pressure transducer, primarily for measuring gauge pressure, comprises first and second identical, substantially cylindrical, sealed capsule assemblies, each having a circular diaphragm at one axial end. The capsule assemblies are welded into the opposite ends of a cylindrical housing, with the diaphragms facing outwardly. The housing is designed to permit the transducer to be mounted in the wall of a pipe or chamber, with the diaphragm of one capsule subjected to the fluid pressure in the pipe or chamber and the diaphragm of the other capsule subjected to ambient atmospheric pressure. Respective inductive displacement sensors produce respective signals indicative of diaphragm displacement. The use of sealed capsules ensures that if a diaphragm ruptures, fluid loss cannot occur.

16 Claims, 3 Drawing Figures

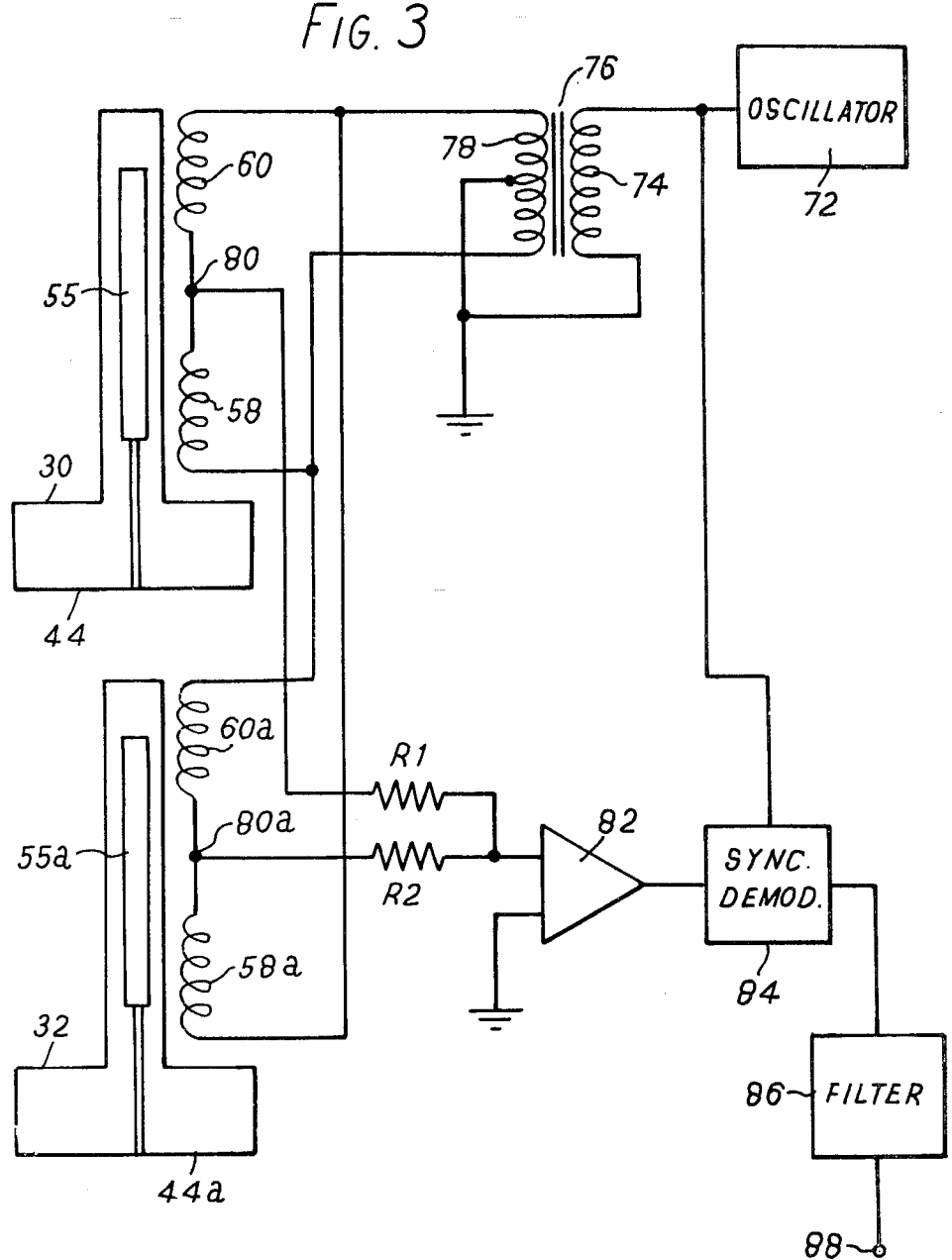

DIFFERENTIAL PRESSURE TRANSDUCER

This invention relates to pressure transducers, and is more particularly, but not exclusively, concerned with differential pressure transducers for use, e.g. as gauge pressure transducers, in aircraft.

One well known type of differential pressure transducer comprises a flexible diaphragm, to the opposite sides of which are applied first and second fluid pressures whose difference is to be sensed. When, as is frequently the case, it is desired to use one of these known differential pressure transducers to sense the gauge pressure of a fluid, that is the pressure of the fluid with respect to ambient atmospheric pressure, then one side of the diaphragm is merely put in communication with the ambient atmosphere, while the other side is exposed to the fluid whose gauge pressure is to be sensed.

Under these circumstances, if the diaphragm of the transducer ruptures, the fluid whose gauge pressure is to be sensed is vented to atmosphere. In an aircraft environment, where the fluid may for example be fuel, lubricant or hydraulic fluid, this situation can be extremely hazardous, if not actually catastrophic.

Obviously there are other environments where either loss of one of the fluids whose pressure difference is to be sensed, or mixing of these fluids, via a rupture in the diaphragm can be undesirable or dangerous.

It is therefore an object of the present invention in the first of its aspects to provide a differential pressure transducer in which the aforementioned disadvantages due to rupture of the diaphragm of the transducer are avoided.

According to the first aspect of the present invention, there is provided a differential pressure transducer comprising:

first and second sealed capsules, the respective pressures inside the capsules being substantially equal, and each capsule including a flexible diaphragm having a first side which is disposed inside the capsule, and a second side which is disposed outside the capsule and is arranged to be subjected, in use, to a respective one of first and second fluid pressures, whereby each diaphragm is displaced, in use, by an amount dependent upon the respective one of the first and second pressures to which it is subjected; and first and second displacement responsive means for producing first and second electrical signals respectively, each signal being representative of the displacement of a respective one of said diaphragms;

whereby the first and second signals are together representative of the difference between the first and second pressures.

Thus if either one of the diaphragms ruptures, the fluid to which the ruptured diaphragm is exposed is merely put in communication with the interior of the respective capsule of which the ruptured diaphragm forms part. The possibility of fluid loss, and the attendant, possibly catastrophic, consequences of such loss, are thus avoided.

Each sealed capsule may be filled with a common reference fluid, such as nitrogen. Alternatively and preferably, each sealed capsule is evacuated.

In a preferred embodiment of the invention, the first and second capsules are substantially identical and generally cylindrical in shape, each diaphragm being substantially circular and forming one axial end of its respective capsule. In this case, the transducer preferably comprises a substantially cylindrical hollow body open at both ends, each capsule being coaxially and sealingly secured, e.g. by welding, in a respective one of said open ends, such that the respective diaphragm of each capsule faces outwardly from the respective open end in which its capsule is secured.

The first and second displacement responsive means are preferably of the inductive type: thus each may comprise at least one winding, and advantageously a pair of axially spaced coaxial windings, and a movable ferromagnetic core disposed coaxially of the winding or windings and movable in response to movement of a respective diaphragm. Preferably, each core is rigidly attached to its respective diaphragm. Advantageously, each core is attached to the first side of its respective diaphragm, whereby the core is disposed inside the capsule of which its respective diaphragm forms part.

The other axial end of each capsule preferably includes a reduced-diameter, cylindrical sleeve projecting coaxially therefrom in a direction away from the diaphragm, each sleeve having a respective one of said cores arranged coaxially therein and having the or each winding associated with that core disposed coaxially therearound.

Conveniently, the body is provided with a radially outwardly projecting flange adapted for sealingly mounting the body in an aperture in a conduit or chamber containing a fluid whose gauge pressure is to be sensed, whereby the diaphragm at one end of the body is subjected, in use, to the pressure of said fluid, and with a casing member which is secured to the body, for example to the flange, and encloses the other end of the body, said casing member being vented to atmosphere, whereby the other diaphragm is subjected to atmospheric pressure.

Where each displacement responsive means comprises a pair of axially spaced coaxial windings, the two windings of each pair are preferably connected together in series to form a respective half bridge, and the transducer preferably further includes an oscillator for applying an AC reference signal to each series-connected pair of windings such that said first and second electrical signals are produced at the respective junctions between the windings of each series-connected pair.

Conveniently, the series-connected pairs of windings are connected in parallel with each other to receive the AC reference signal, one pair being reverse connected with respect to the other pair so that the first and second electrical signals are of opposite polarity. In this case, the transducer may further comprise a summing amplifier connected to said junctions, and may also include a synchronous demodulator, which is connected to the output of the summing amplifier and arranged to be controlled in synchronism with said AC reference signal, and a filter, whereby the transducer produces a DC output signal.

According to a second aspect of the invention, there is provided a pressure transducer comprising: a generally cylindrical capsule having a substantially circular diaphragm forming one axial end thereof, the other axial end of the capsule having a reduced-diameter substantially cylindrical sleeve projecting coaxially therefrom in a direction away from the diaphragm;

at least one winding disposed coaxially around the outside of said sleeve; and a ferromagnetic core disposed coaxially inside the sleeve and secured to the diaphragm;

whereby movement of the diaphragm moves the core within the winding.

The capsule may be evacuated and sealed, in which case the transducer serves as an absolute pressure transducer, or may be vented to atmosphere, in which case the transducer serves as a gauge pressure transducer.

The transducer may further comprise a substantially cylindrical hollow body open at at least one end, the capsule being sealingly secured, e.g. by welding, in said open end so that the diaphragm faces outwardly from said open end. The body may be provided with a radially outwardly projecting flange adapted for sealingly mounting the body in an aperture in a conduit or chamber containing a fluid whose absolute or gauge pressure is to be sensed, such that the diaphragm is subjected, in use, to the pressure of the fluid.

The invention will now be described, by way of example only, with reference to the accompanying drawings, of which:

FIG. 3 is a simplified block circuit diagram of an electronic circuit for use with the transducer of FIG. 1.

Figure 1:
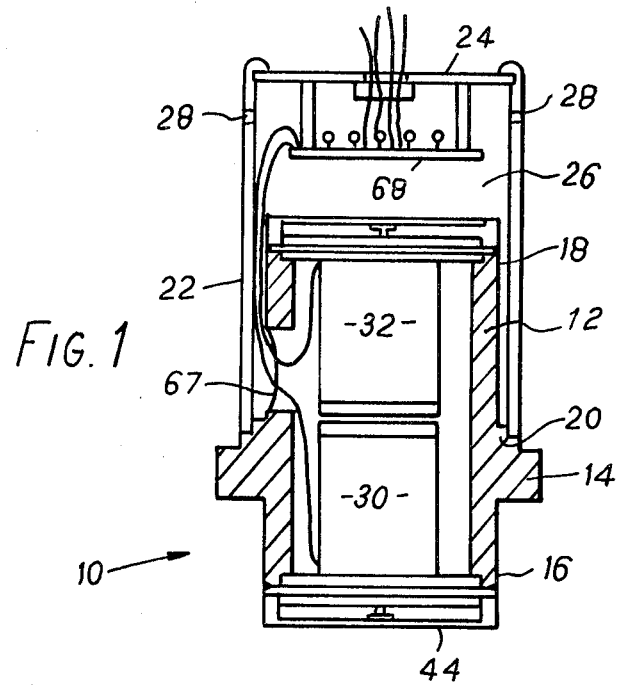
FIG. 1 shows partly in section a pressure transducer in accordance with the present invention.

The differential pressure transducer of FIG. 1 is indicated generally at 10, and comprises a housing constituted by a hollow, substantially cylindrical, stainless steel body 12 open at both ends. The body 12 has a radially outwardly projecting mounting flange 14 disposed slightly nearer to one end 16 thereof than to the other end 18, the flange 14 having a circumferentially extending double step 20 on the side thereof nearer to the end 18. A hollow, cylindrical, stainless steel casing member 22, also open at both ends, has one end electron beam welded to the radially outer step of the double step 20. The other end of the casing member 22 extends beyond the end 18 of the body 12, and is substantially closed by a disc 24 crimped or otherwise secured therein to define a chamber 26 around the end 18 of the body 12. The casing member 22 is provided with a number of apertures or vents, such as those indicated at 28, to vent the chamber 26 to ambient atmospheric pressure.

Figure 2:
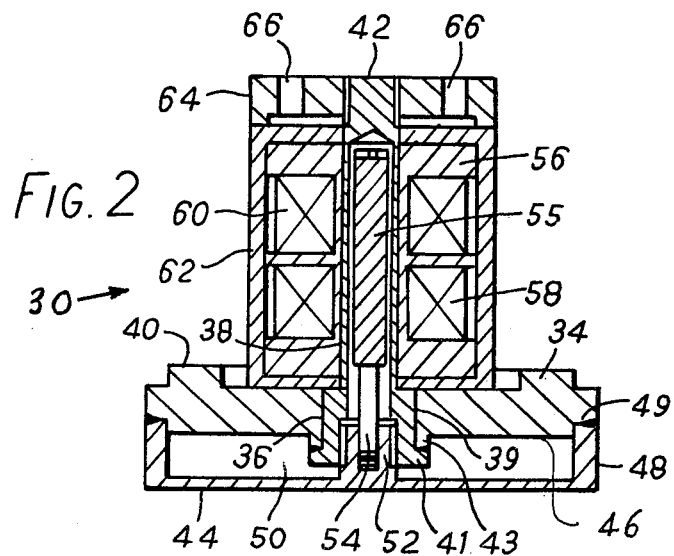
FIG. 2 is a detailed sectional view of a sealed capsule assembly forming part of the transducer of FIG. 1.

Two substantially identical sealed capsule assemblies 30 to 32 are electron beam welded into, and sealingly close, the ends 16 and 18 respectively of the body 12, the sealed capsule assembly 30 being shown in more detail in FIG. 2.

The sealed capsule assembly 30 of FIG. 2 comprises a circular stainless steel disc 34 having a central aperture 36. A hollow cylindrical sleeve 38 extends coaxially through the aperture 36 to project from one side 40 of the disc 34, the end of the sleeve remote from the disc being integrally closed at 42. The other end 39 of the sleeve 38 has a radially outwardly extending flange 41, which is electron beam welded to a central boss 43 formed on the other side 46 of the disc 34 around the aperture 36. A flexible, circular, sensing diaphragm 44, substantially equal in diameter to the disc 34, is disposed coaxial with and parallel to the disc 34, the diaphragm 44 being spaced from the other side 46 of the disc. The diaphragm 44, which is typically 0.4 mm thick and also made from stainless steel, has an axially projecting circumferential flange 48 which is electron beam welded under vacuum to a suitably stepped portion 49 of the periphery of the disc 34, on the side 46 thereof: thus the disc 34, the sleeve 38 and the diaphragm 44 together define a completely sealed and evacuated chamber 50.

The diaphragm 44 is provided with an integrally formed hollow central boss 52, which projects towards the disc 34 and in which is threaded a non-magnetic rod 54. The rod 54 projects coaxially into the sleeve 38, and carries a hollow armature or core 55 made from Radio Metal, mu-metal or other suitable ferromagnetic (e.g. iron/nickel) alloy.

A machined ceramic bobbin 56 is mounted coaxially around the outside of the sleeve 38, and carries two axially spaced windings or coils 58, 60 respectively of high temperature polyester/polyamide-imide insulated copper wire, typically forty seven gauge: the coils 58, 60 thus coaxially surround the core 55. The bobbin 56 and coils 58, 60 are enclosed within a cylindrical mu-metal magnetic screening case 62, and the assembly of bobbin, coils and case is clamped against the side 40 of the disc 34 by a retaining ring 64 threaded on the outside of the closed end 42 of the sleeve 38. The retaining ring 64 is apertured, as shown at 66, to receive a suitable ring spanner during assembly/disassembly, while the case 62 is also apertured (not shown) to permit connecting leads (not shown) to be connected to the coils 58 and 60.

Referring again to FIG. 1, the body 12 is apertured at 67 to permit the aforementioned connecting leads for the coils 58 and 60 of the sealed capsule assembly 30, and the corresponding connecting leads for the sealed capsule assembly 32, to pass into the chamber 26, where they are connected to a printed circuit board 68. The board 68 carries at least part of an electronic circuit for applying signals to, and processing signals received from, the respective coils of the capsule assemblies 30, 32, which electronic circuit is illustrated at 70 in FIG. 3.

The circuit 70 of FIG. 3 comprises a sine wave oscillator 72, which is arranged to produce a sine wave output signal of predetermined (and controlled) amplitude and a typical frequency of about 10 kHz. The output of the oscillator 72 is connected to the primary winding 74 of a transformer 76 having a centre-tapped secondary winding 78. The coils 58, 60 of the sealed capsule assembly 30 are series connected to form a half bridge circuit, while the corresponding coils 58a and 60a of the sealed capsule assembly 32 are also series connected to form a half bridge circuit. Both half bridge circuits are connected to receive the sine wave signal produced by the secondary winding 78 of the transformer 76: however, the coils 58a, 60a are effectively reversed with respect to the coils 58, 60 so that they receive a phase-reversed (or inverted) version of the sine wave signal produced by the winding 78.

The respective junctions 80, 80a between the coils 58, 60 and between the coils 58a, 60a are connected via respective summing resistors R1, R2 to the input of an AC summing amplifier 82. The output of the amplifier 82 is connected to a synchronous demodulator 84, which has a control input connected to the output of the oscillator 72. The output of the demodulator 84 is connected to the input of a low pass filter 86, which is arranged to attenuate the 10 kHz ripple normally present in the demodulated signal produced by the demodulator 84. The output of the filter 86 is connected to a terminal 88, which constitutes the output terminal of the transducer 10.

In use, the transducer 10 is mounted in an aperture in the wall of a conduit or chamber (not shown) containing a fluid whose gauge pressure is to be sensed, with the flange 14 in sealing engagement with the periphery of the aperture. The diaphragm 44 of the sealed capsule assembly 30 is thus subjected to the absolute pressure of this fluid, and moves the core 55 within the coils 58, 60 by an amount dependent upon the magnitude of this absolute pressure.

The movement of the core 55 within the coils 58, 60 changes the respective inductances of the coils in opposite senses, e.g. decreasing the inductance of the coil 58 while increasing the inductance of the coil 60, thereby unbalancing the half bridge formed by the coils. A sine wave output voltage dependent upon the absolute value of the pressure of the fluid therefore appears at the junction between the coils 58, 60. In an exactly analogous manner, a sine wave output voltage dependent upon the absolute value of ambient atmospheric pressure appears at the junction between the coil 58a, 60a of the sealed capsule assembly 32: however this latter output voltage is phase inverted (i.e. of opposite polarity) with respect to the first mentioned output voltage. It will be appreciated that the difference between these two output voltages is thus representative of the gauge pressure of the fluid.

The summing amplifier 82 receives and sums the respective output voltages at the junctions between the coils 58, 60 and 58a, 60a, to produce an AC voltage dependent upon the difference between the output voltages (since the output voltages are of opposite polarity). This AC voltage is synchronously demodulated in the demodulator 84 and filtered in the filter 86 to produce at the terminal 88 a DC output voltage, whose magnitude is dependent upon the gauge pressure of the fluid. The terminal 88 is typically connected to an analogue meter, for display purposes, although the DC voltage at the terminal 88 can of course be alternatively or additionally used for control purposes.

It will be readily appreciated that if the diaphragm 40 of the capsule assembly 30 ruptures, the fluid whose gauge pressure is being sensed will merely enter the otherwise-sealed chamber 50 within the capsule assembly, where it will be contained. Thus although the transducer 10 will no longer provide an accurate gauge pressure indication, any fluid leaking through the ruptured diaphragm will be contained within the chamber 50, and no fluid loss to atmosphere can occur.

The transducer 30 has other significant advantages. For example, the use of the two substantially identical capsule assemblies 30, 32 provides a significant amount of automatic temperature compensation, since the respective temperatures of the capsules tend to track each other fairly closely by virtue of their proximity and attachment to the body 12.

Various modifications can be made to the transducer 10. For example, the diaphragms can be made from a material other than stainless steel, e.g. phosphor-bronze or beryllium-copper. Further, since as already mentioned, the capsule assemblies tend to track each other in temperature, they need not be evacuated, but can instead be filled with a neutral reference gas such as nitrogen at a common pressure. Moreover, the respective inductance-type displacement sensing devices based on the movable cores and their associated coils can be replaced by other inductance-type displacement sensing devices, or by capacitance-type devices (in which, for example, each diaphragm forms one electrode or plate of a variable capacitance) or by strain gauge type devices (in which, for example, one or more strain gauges is directly attached to each diaphragm).

I claim:

1. A differential pressure transducer comprising:

a housing member;

first and second substantially identical, generally cylindrical, evacuated and sealed capsules, which are mounted in the housing member such that their respective temperatures tend to track each other, each capsule being closed at one axial end by a respective flexible diaphragm having a first side which is disposed inside the capsule, and a second side which is disposed outside the capsule and is arranged to be subjected, in use, to a respective one of first and second fluid pressures, whereby each diaphragm is displaced, in use, by an amount dependent upon the respective one of the first and second pressures to which it is subjected; and first and second displacement responsive means for producing first and second electrical signals respectively, each signal being representative of the displacement of a respective one of said diaphragms;

whereby the first and second signals are together representative of the difference between the first and second pressures.

2. A differential pressure transducer comprising:

a housing member;

first and second substantially identical, generally cylindrical sealed capsules, which are mounted in the housing member such that their respective temperatures tend to track each other and which are filled with a common reference gas such that the respective pressures inside the capsules are substantially equal, each capsule being closed at one axial end by a respective flexible diaphragm having a first side which is disposed inside the capsule, and a second side which is disposed outside the capsule and is arranged to be subjected, in use, to a respective one of first and second fluid pressures, whereby each diaphragm is displaced, in use, by an amount dependent upon the respective one of the first and second pressures to which it is subjected; and first and second displacement responsive means for producing first and second electrical signals respectively, each signal being representative of the displacement of a respective one of said diaphragms;

whereby the first and second signals are together representative of the difference between the first and second pressures.

3. A transducer as claimed in claim 2, wherein the common reference gas is nitrogen.

4. A transducer as claimed in claim 1 or claim 2, wherein the housing member comprises a substantially cylindrical hollow body open at both ends, each capsule faces outwardly from the respective open end in which its capsule is secured 5. A transducer as claimed in claim 4, wherein the body is provided with a radially outwardly projecting flange adapted for sealingly mounting the body in an aperture in a conduit or chamber containing a fluid whose gauge pressure is to be sensed, whereby the diaphragm at one end of the body is subjected, in use, to the pressure of said fluid, and with a casing member which is secured to, and encloses the other end of, the body, said casing member being vented to atmosphere, whereby the other diaphragm is subjected to atmospheric pressure.

6. A transducer as claimed in claim 5, wherein the casing member is secured to the flange.

7. A transducer as claimed in claim 1 or claim 2, wherein each capsule is secured in the respective one of said open ends by welding.

8. A transducer as claimed in claim 1 or claim 2, wherein the first and second displacement responsive means are of the inductive type.

9. A transducer as claimed in claim 8, wherein each displacement responsive means comprises at least one winding, and a movable ferromagnetic core disposed coaxially of the winding or windings and movable in response to movement of a respective diaphragm.

10. A transducer as claimed in claim 9, wherein each displacement responsive means comprises a pair of axially spaced coaxial windings.

11. A transducer as claimed in claim 10, wherein the two windings of each pair are connected together in series to form a respective half bridge, and further including an oscillator for applying an AC reference signal to each series-connected pair of windings such that said first and second electrical signals are produced at the respective junctions between the windings of each series-connected pair.

12. A transducer as claimed in claim 11, wherein the series connected pairs of windings are connected in parallel with each other to receive the AC reference signal, one pair being reverse connected with respect to the other pair so that the first and second electrical signals are of opposite polarity.

13. A transducer as claimed in claim 12, further comprising a summing amplifier connected to said junctions, a synchronous demodulator connected to the output of the summing amplifier and arranged to be controlled in synchronism with said AC reference signal, and a filter connected to receive the output of the synchronous demodulator, whereby the transducer produces a DC output signal.

14. A transducer as claimed in claim 9, wherein each core is rigidly attached to its respective diaphragm.

15. A transducer as claimed in claim 9, wherein each core is attached to the first side of its respective diaphragm, whereby the core is disposed inside the capsule of which its respective diaphragm forms part.

16. A transducer as claimed in claim 15, wherein the first and second capsules are substantially identical and generally cylindrical in shape, each diaphragm being substantially circular and forming one axial end of its respective capsule, and wherein the other axial end of each capsule includes a reduced-diameter, cylindrical sleeve projecting coaxially therefrom in a direction away from the diaphragm, each sleeve having a respective one of said cores arranged coaxially therein and having the or each winding associated with that core disposed coaxially therearound.

* * * * *